Aug. 4, 1936.  G. W. NESMITH  2,049,973

SPREADER CAP FOR MUCILAGE CONTAINERS

Filed Aug. 25, 1934

GEORGE W. NESMITH.
*INVENTOR.*

BY *James R. Cole*

*ATTORNEYS.*

Patented Aug. 4, 1936

2,049,973

UNITED STATES PATENT OFFICE 2,049,973

SPREADER CAP FOR MUCILAGE CONTAINERS

George W. Nesmith, Tulsa, Okla.

Application August 25, 1934, Serial No. 741,459

3 Claims. (Cl. 91—67.5)

My invention relates to new and useful improvements in spreader caps for mucilage containers which is particularly adapted for use with a seal cover such as disclosed in Letters Patent No. 1,946,330 issued to me under date of February 6, 1934 and has for its object to provide a free flowing uniform spreader wherewith mucilage in the container may be applied to the article whereon it is desired to spread the adhesive.

With the above and other objects in view which will be disclosed as the description proceeds, my invention consists in the novel features hereinafter set forth, shown in the accompanying drawing and more particularly pointed out in the appended claims.

Referring to the drawing in which like figures represent similar parts thruout the several views.

Figure 1:
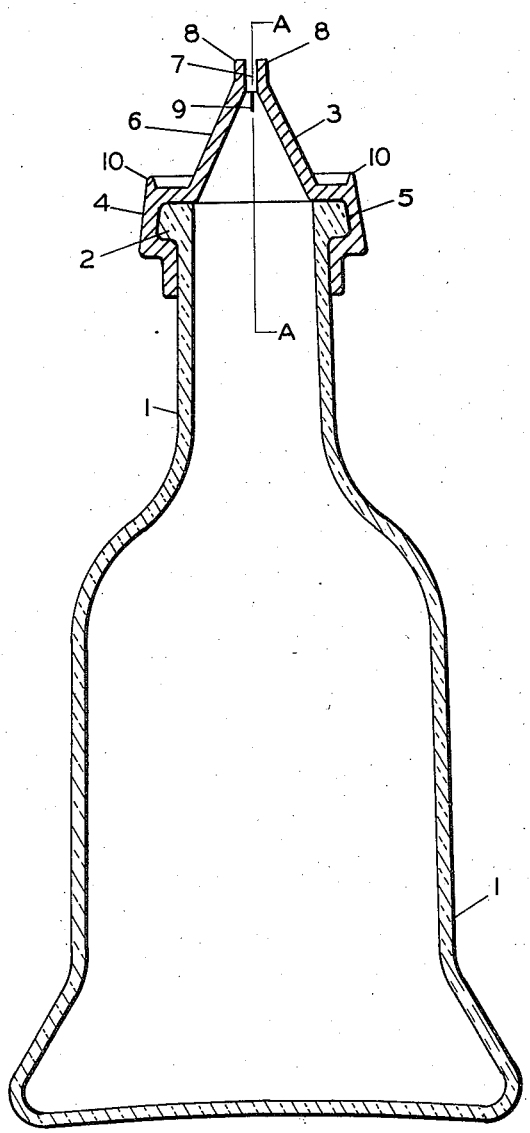
Fig. 1 is a view in longitudinal cross section of my spreader cap attached to a mucilage container.
Figure 3:
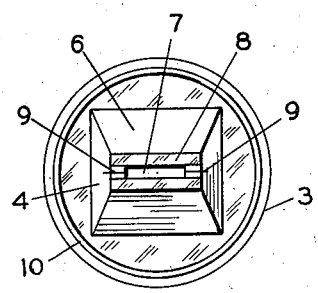
Fig. 3 is a top plan view of said cap.
Figure 2:
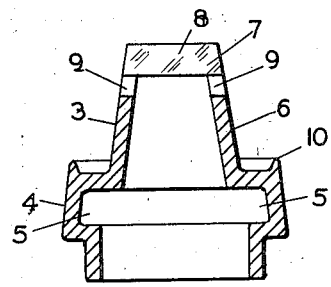
Fig. 2 is a view of said cap in cross section on line A—A of Fig. 1.

Numeral 1 represents a musilage bottle with a rim 2 around its mouth, and 3 my spreader cap made of a flexible or resilient material such as soft rubber and having a base portion 4 adapted to be slipped over rim 2 and held thereon in groove 5 in said spreader cap. The spreader portion 6 of the cap is preferably in the general form of a truncated pyramid ending in a mouth tip 7 having flexible protruding lips 8 separated by a long slit or an open narrow slot between the two lips, and in either case preferably with the side wall of the spreader adjacent to the mouth 7 thereof slit for a short distance as at 9. An upwardly projecting rim or flange 10 lays about the outer circumference of the top of the base portion of the spreader.

In use the cap 3 is placed on the mucilage bottle 1, and the bottle inverted to cause its liquid to flow into the cap, and the object whereon the mucilage is to be spread is lightly brushed with the spreader tip. Whether the spreader is made with an open mouth or with merely a slit, it permits of a free flow of the mucilage, and the lips of the mouth flex to lightly brush the object. When the mouth consists of merely a slit, the friction of the protruding lips, in applying the spreader causes the mouth to open. The slit at the side of the mouth permits an additional flexing of the mouth, and, together with the lips, operate to feed the mucilage onto the object whereon it is spread. The rim 10, prevents an overflow of mucilage from running down the side of the container, and may occasionally be washed off, although frequent washings thereof are unnecessary in as much as the feed provided for the flow of the mucilage is under control of the pressure on the lips of the spreader.

Having thus fully disclosed my invention, what I claim and desire to secure by Letters Patent is:

1. In a mucilage spreader cap of resilient material adapted to be attached to a mucilage container, a mouth outlet therefrom having independently protruding flexible lips, and a slit, in said cap at either end of said mouth outlet and communicating with said mouth outlet.

2. A mucilage spreader cap of resilient material, comprising a base portion adapted to be attached to the mouth of a mucilage container, an upwardly extending spreader portion, a relatively long narrow mouth outlet at the apex of said spreader, a pair of flexible independently protruding lips extending from said mouth outlet positioned one on either side of said mouth outlet, and a slit in said cap on either end of said mouth outlet and communicating with said mouth outlet.

3. In a mucilage spreader cap of resilient material, an open mouth outlet therefrom having a pair of flexible lips independent of each other and independently protruding from said mouth outlet and positioned one on either side of said mouth outlet, and a slit in said cap at either end of said mouth outlet and communicating with said mouth outlet.

GEORGE W. NESMITH.